United States Patent [19] [11] Patent Number: 5,436,613
Ghosh et al. [45] Date of Patent: Jul. 25, 1995

[54] SYSTEM FOR DETECTING HUMAN PRESENCE IN HAZARDOUS SITUATIONS

[75] Inventors: Kalyan Ghosh, Montréal; Tapan K. Bose, Trois-Rivi e,acu e×res; Raymond Courteau, St-Maurice; Pierre Gibello, Laval, all of Canada

[73] Assignee: Institut de Recherche en Sante et en Securite du Travail, Montreal, Canada

[21] Appl. No.: 61,403

[22] Filed: May 13, 1993

[51] Int. Cl.$^6$ .............................................. G08B 23/00
[52] U.S. Cl. ...................... 340/573; 340/904; 324/666; 324/663; 395/90; 395/88; 395/97; 395/124
[58] Field of Search ........... 340/573, 124, 904; 323/219; 324/663, 666; 364/461; 395/90

[56] References Cited

U.S. PATENT DOCUMENTS

| 3,874,660 | 10/1973 | Piso | 324/61 R |
|---|---|---|---|
| 3,947,734 | 3/1976 | Fyler | 361/181 |
| 4,169,260 | 9/1979 | Bayer | 340/562 |
| 4,300,116 | 11/1981 | Stahovec | 340/904 |
| 4,345,167 | 8/1982 | Calvin | 307/308 |
| 4,661,797 | 4/1987 | Schmall | 324/661 |
| 4,727,330 | 2/1988 | Funk | 324/445 |
| 4,743,894 | 5/1988 | Bochmann | 340/691 |
| 5,027,552 | 7/1991 | Miller | 49/27 |
| 5,172,065 | 12/1992 | Wallrafen | 324/683 |
| 5,177,445 | 1/1993 | Cross | 324/637 |

OTHER PUBLICATIONS

Millard, D. L. "AN In–Situ Evaluation of a Capactive Sensor Based Safety System . . . " Paper No. MS89–301. Society of Manuf Engineers P.O. Box 930 Dearborn, Mich 48121 (1989).
Jaquet, Faulhaber et al., "Protection proximétrique sur robot: Application d'un détecteur capacitif".
ND 1618–126–87 Institute National de Recheche et de Sécuteté 30, rue Olivier–Noyer 75680 Paris Cedex 14, France.

Primary Examiner—John K. Peng
Assistant Examiner—Albert Wong
Attorney, Agent, or Firm—Quarles & Brady

[57] ABSTRACT

The disclosure relates to a system for the detection of human presence in hazardous situations near moving machinery; appropriately shaped electrodes are placed in an area to be safeguarded and a radio-frequency signal of appropriate frequency and voltage is applied on the electrodes creating an alternating electric field around them. A bridge circuit is used to measure the capacitive impedance created by the electrodes and a dissipation factor is calculated from the real and imaginary parts of the impedance. If a foreign object is introduced into the electric field, the characteristics of the dielectric are modified creating a change of the value of the dissipation factor. The dissipation of energy in the high frequency region is much greater if this foreign object is a biological tissue as compared to other types of materials, such as conductors or insulators. Thus, the system detects human presence by noting the increase of the dissipation factor above a threshold value, and the movement of the appropriate machine part can then be stopped, thereby eliminating the danger of injury to the person.

7 Claims, 6 Drawing Sheets

SYSTEM FOR DETECTING HUMAN PRESENCE IN HAZARDOUS SITUATIONS

The present invention pertains to a system for the detection of human presence in hazardous situations, such as adjacent moving machinery.

BACKGROUND OF THE INVENTION

Automated machinery, such as robots, are used in the modern industry in ever-increasing number. In order to prevent accidents in such automated installations, it is therefore important to have a reliable system to detect the presence of humans near the moving parts of machines. During normal operation, robots work in an autonomous manner. However, the presence of humans near the robots is essential during maintenance and programming operations. In order to prevent injuries to technicians due to collision with the robot arm, there is need for a detection system which will produce a signal when the arm comes dangerously close to a person. This signal can be used to stop the movement of the robot arm.

A number of different approaches have been used in designing detection systems of human presence, such as:
a) Ultrasonic system
b) Infrared system
c) Microwave Doppler radar system
d) Photoelectric system
e) "Sensitive skin" tactile system
f) System using artificial vision
g) Capacitive system Research has been done on these detection methods and the most promising ones in industrial situations have been the vision and the capacitive systems. It is potentially very appealing to have cameras installed above and around a robot workcell, and this vision system can then be used to stop the robot arm when collision with a person becomes imminent. However, to operate in real time in this manner, the image has to be captured and analyzed in a few milliseconds. This is not feasible in the present state of technology. Better success has been achieved by simplifying the image, wherein sources of light are installed on the helmet of the technician and on the extremity of the robot arm. The vision system then monitors the distance between these two points and emits an alarm signal if this distance becomes smaller than a predetermined value.

In the capacitive systems, use is made of the fact that the capacitive coupling between two metal antennas, or between a single antenna and the ground, will be increased by the nearby presence of a human body or other conductive objects in the vicinity. A number of devices have been proposed, where the increase of capacitance caused by the approach of an object near the antenna is measured by a suitable method, such as the resonance conversion method or the reactance conversion method.

The prior art in this field may be found described in the following articles: a) MILLARD, D. L. (1989), "An In-Situ Evaluation of a Capacitive Sensor-Based Safety System for Automated Manufacturing Environments", Paper No. MS89-301, Society of Manufacturing Engineers, P.O. Box 930, Dearborn, Mich. 48121; and b) JACQUET, P., FAULHABER, J. P., DE KERMOYSAN, A., and KNEPPERT, M. (1987), "Protection proximétrique sur robot: Application d'un détecteur capacitif", Cahiers de notes documentaires no ND 1618-126-87, Institut National de Recherche et de Sécurité, 30, rue Olivier-Noyer, 75680 Paris cedex 14, France.

The prior art also may be found in patents. For example, U.S. Pat. No. 4,345,167 issued to Calvin on Aug. 17, 1982 discloses a method for detecting a human; the device measures the change in capacitance in an antenna as a person approaches. An antenna is repetitively charged with a voltage and discharged trough a discharge resistor and an averaging capacitor. The approach of the antenna by a person results in a larger discharge current, and hence, an increased voltage across the resistor. The voltage is AC coupled to a comparator, the change in state of which signals an approach.

U.S. Pat. No. 4,169,260 issued to Bayer on Sep. 25, 1979 discloses a capacitive intrusion detector utilizing a reference oscillation drift. Protected bodies are connected to form an antenna that is excited by a voltage controlled oscillator, the phase of which is compared to that of a reference oscillator signal. The presence of a person causes the capacitive reactance of the antenna and the frequency of the oscillator to change. This change in frequency is manifest as a shift in phase between the signal of the oscillator and that of the reference oscillator. The change in phase causes an output that indicates the presence of a person.

U.S. Pat. No. 4,661,797 issued Apr. 28, 1987 to Schmall describes capacitive electrodes fixed to the arm of a robot to determine the oscillation frequency of a measuring circuit. A variation in the impedance due to the proximity of a human body or even its direct contact therewith causes a frequency variation which is detected.

Although capacitive detection systems have been used in the recent past in various applications, there has been frequent cases of false triggering caused by variations of environmental factors (such as temperature and humidity of air) and interference from other systems in the plant, such as walkie-talkies. Another problem that plagues the use of capacitive systems in robotic installations is that a change of capacitance is produced not only by the presence of a human, but also because of the presence of many other types of materials (such as a piece of metal). The robot arm must be stopped if it comes too close to the body of a person. However, the detection system must not stop the arm when it approaches a piece of metal, because that is a part of the normal activity of the robot. This problem has been solved by recording an "ideal" signature pattern when the robot performs a typical work cycle. During the regular operation of the robot in production, the signature of each cycle is compared with the ideal signature. If the robot arm happens to approach a person, the two signatures will no longer match and the arm will be stopped. This system works satisfactorily well when the robot continuously repeats identical movements during automated production. However, no fixed pattern of arm movement is repeated during programming or maintenance operations, and this method can no longer be used to identify an unsafe situation which is produced when the robot arm moves very close to the body of the person.

Thus, none of the prior art devices identified above is capable of discriminating between a human and an inanimate object.

SUMMARY AND OBJECTS OF THE INVENTION

One object of the present invention is to create a detection system which is able to distinguish a human from inanimate objects, such as those made of metals or plastics. When used on the arm of a robot, the present invention will generate a signal (which could be used to stop the robot arm) if the arm comes dangerously close to a human, but no such signal will be emitted if the arm approaches a workpiece. This capability of discrimination of humans from metals or plastics is based on the property of certain biological tissues to dissipate more energy compared to other materials when subjected to a high-frequency electric field.

Another object of the invention is to provide an improved safety system for personnel who performs operations such as programming and maintenance in robotic installations.

Another object of the invention is to ensure a proper level of safety during operation and maintenance of automated storage and retrieval systems used in modern warehouses.

Another object of the invention is the prevention of collisions of automated guided vehicles with plant personnel.

Another object of the invention is to provide an improved method of guarding machines, such as machine tools, sawing machines, power presses, etc., so as to ensure safety of operators and maintenance workers.

Another object of the invention is to provide adequately-controlled openings on barriers enclosing automated work areas, so that materials carried on conveyors could pass through these openings, but the present invention will prevent humans from entering through them.

A further object of the invention is to provide detection means to be fitted on automatically-operated doors, so that the door movement (opening or closing) could be controlled depending on the presence of humans in the vicinity.

A still further object of the invention is to improve the safety of children using school buses, wherein the devices will be fitted near the wheels of the buses, and the presence of a child in the electric field will sound an alarm and stop the bus.

The present invention therefore relates to a system for discriminating the human presence in a given area, comprising:

an arrangement of electrodes located in this area defining a condenser having dielectric characteristics including an impedance $Z_x$ and a dissipation factor D;

means applying a radio frequency signal to the arrangement of electrodes to create an alternating electric field around the electrodes whereby human presence in the field causes a change of the characteristics of the dielectric of the condenser;

means calculating the dissipation factor D; and means associated with the calculating means for determining a human presence in the area when a change of the dissipation factor D exceeds a predetermined threshold value.

In one preferred form of the invention, the calculating means include an impedance bridge to measure real and imaginary parts of the impedance of the arrangement of electrodes.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

This invention will be better understood and its concomitant advantages will be better appreciated by those of skill in the art after a consideration of the description which appears below in conjunction with the accompanying drawings in which.

DESCRIPTION OF THE PREFERRED EMBODIMENTS

This invention for detecting human presence is based on the measurement of the dissipation factor D of the dielectric in a capacitive system, which is given by the equation:

$$D = \tan \delta = \frac{\epsilon''}{\epsilon'} \quad (1)$$

where $\delta$ = loss angle $\epsilon''$ = dielectric loss, and $\epsilon'$ = dielectric constant.

The materials found in nature are: (a) conductors such as metals, (b) insulators (or non-polar dielectrics) containing molecules which do not have permanent dipole moments, and (c) polar dielectrics containing molecules with permanent dipole moments. In an alternating electric field, the conductors can dissipate energy by Joule effect and the polar materials dissipate by dielectric relaxation. In the radio-frequency region, most of the solid materials are either good conductors or good insulators. But, the biological tissues behave as semi-conductors as well as strongly polar materials.

In the present invention, the principle of detection is based on the fact that, placed in a radio-frequency electric field, the biological tissues dissipate significantly more energy compared to other materials.

Figure 1:
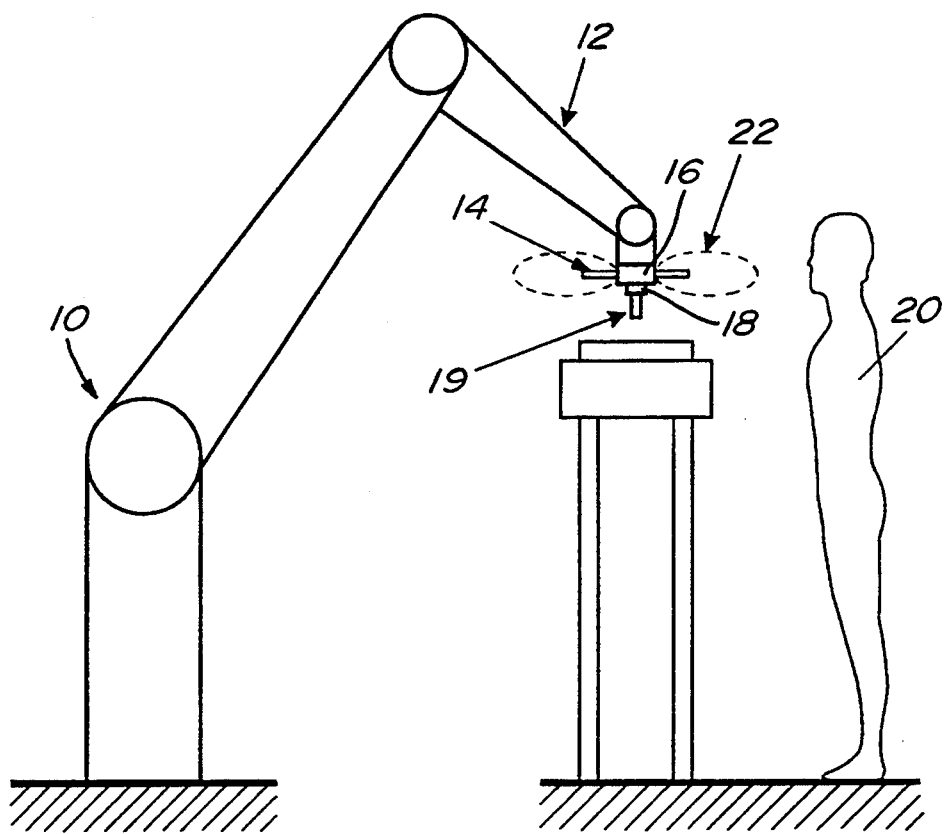
FIG. 1 illustrates the manner in which the invention can be used to protect persons who work near active robots.

FIG. 1 shows the manner in which the present invention could be used to protect technicians who work near active robots 10 from being hit by the moving robot arm 12. An electrode 14 of toroidal shape is placed on the robot wrist 16 near the end effector 18 supporting a workpiece 19 and it is connected to an appropriate radio-frequency source, so that a condenser is formed between this electrode and the robot arm. When a person 20 enters the electric field 22 around the electrode, there is a significant increase of the dissipation factor of this condenser. The presence of a human in this hazardous situation is detected by knowing the value of the dissipation factor (which is obtained by measuring the phase angle between the voltage and the current). Then the movement of the robot arm may be stopped.

Figure 2:
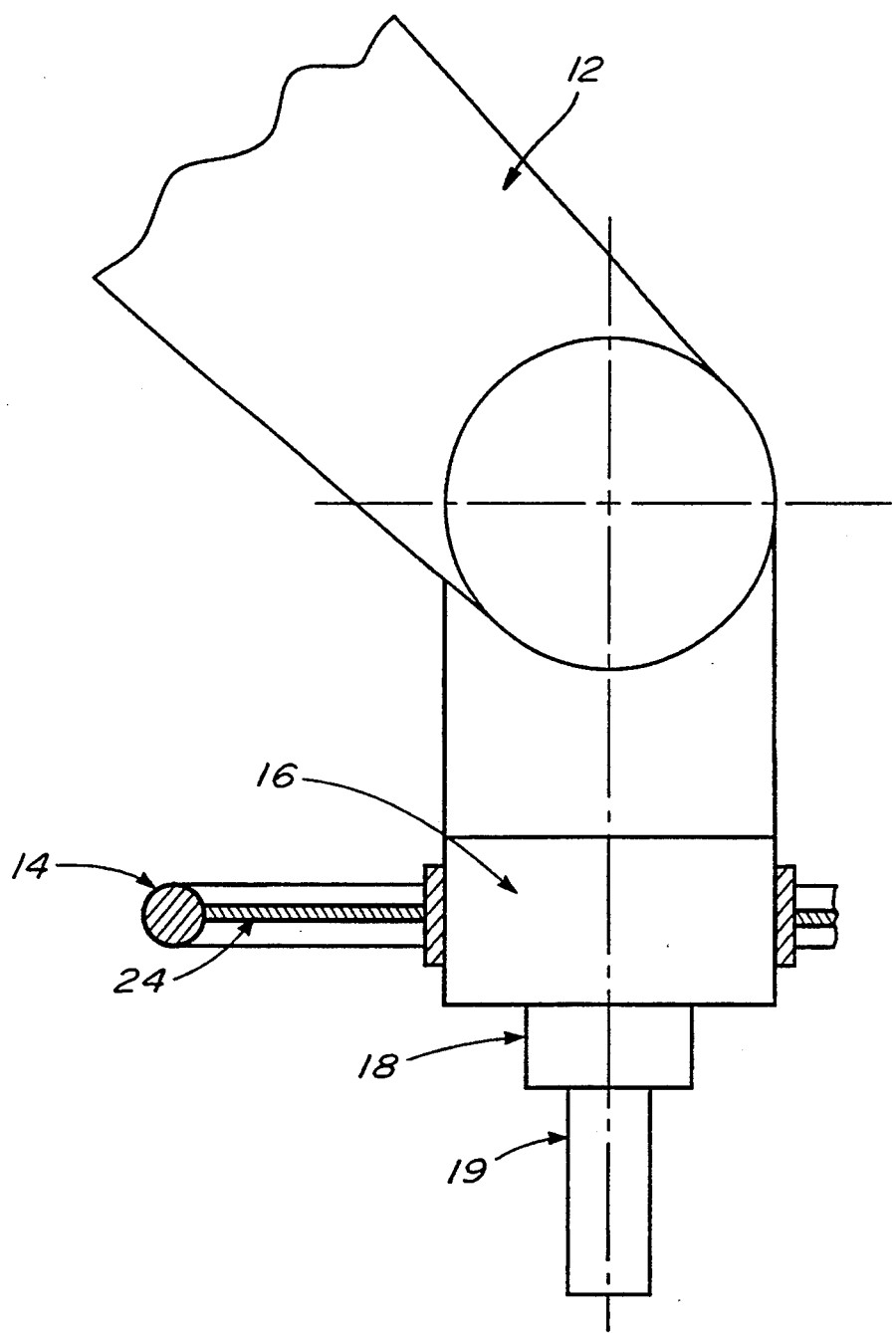
FIG. 2 shows how one electrode is installed on the robot wrist.

FIG. 2 is an enlarged view showing the metallic electrode 14 installed on the robot wrist 16 using supporting members 24 of insulating material.

This example illustrated in FIGS. 1 and 2 is provided to illustrate an application of the present invention in robotic installations. However, it can as well be used in other types of situations by using electrodes of suitable shape and by installing the electrode to have an electric field at the appropriate place.

Figure 3:
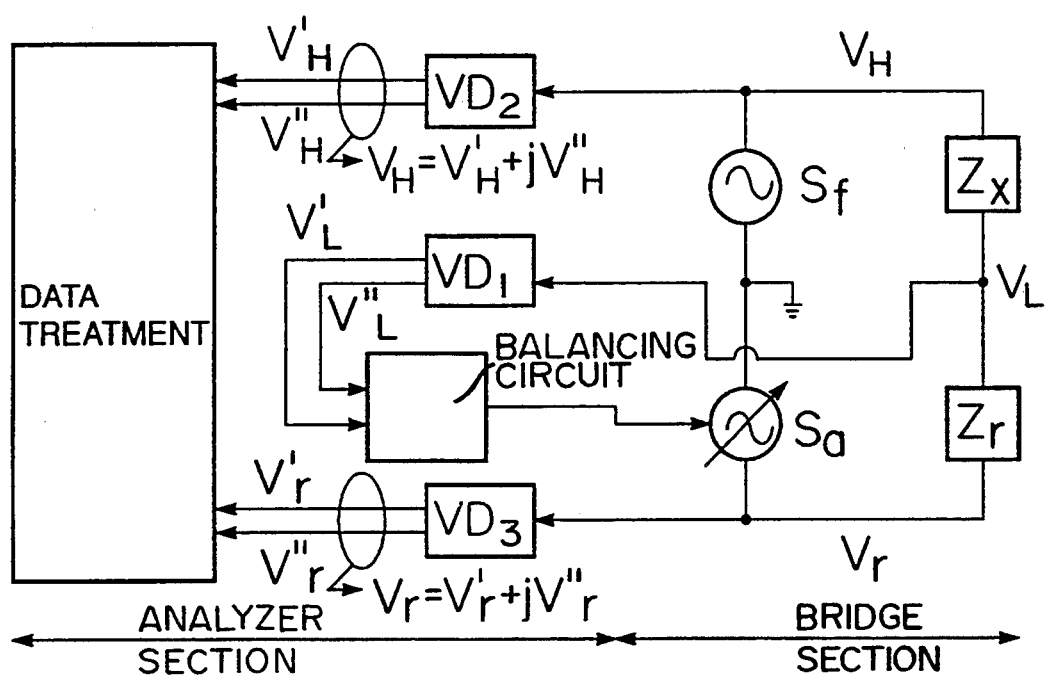
FIG. 3 is a schematic diagram illustrating the principle used to measure the capacitive impedance of the electrode arrangement.

FIG. 3 is a schematic diagram which indicates the operating principle of the circuit used to measure the dissipation factor. The capacitive impedance $Z_x$ created by the electrodes is measured by using a digitally-controlled bridge. The bridge consists of a known reference impedance $Z_r$, a fixed voltage source $S_f$ and a source of adjustable voltage $S_a$. The sources $S_f$ and $S_a$ produce a sinusoidal voltage at the operating frequency $f_{op}$, but in addition, $S_a$ is adjustable in amplitude and in phase. A vectorial detector, $VD_1$, is used to measure the complex amplitude of the unbalanced signal $V_L$ between each of the arms of the bridge. During the operation of the measuring bridge, the voltage produced by $S_a$ is continuously adjusted by the feedback loop of the balancing circuit in order to reduce $V_L$ to zero. When the latter condition is achieved with sufficient precision, the bridge is in balance and the following relationship is true.

$$\frac{V_H}{V_r} = \frac{Z_x}{Z_r} \qquad (2)$$

The vectorial detectors $VD_2$ and $VD_3$ are used to measure $V_H$ and $V_r$ accurately, so that $Z_x$ can be calculated according to equation (2). The dissipation factor D is then calculated using the equation $$D = \frac{Z_x'}{Z_x''} \qquad (3)$$

where $Z'_x$ and $Z''_x$ are respectively the real and the imaginary parts of $Z_x$.

Figure 4:
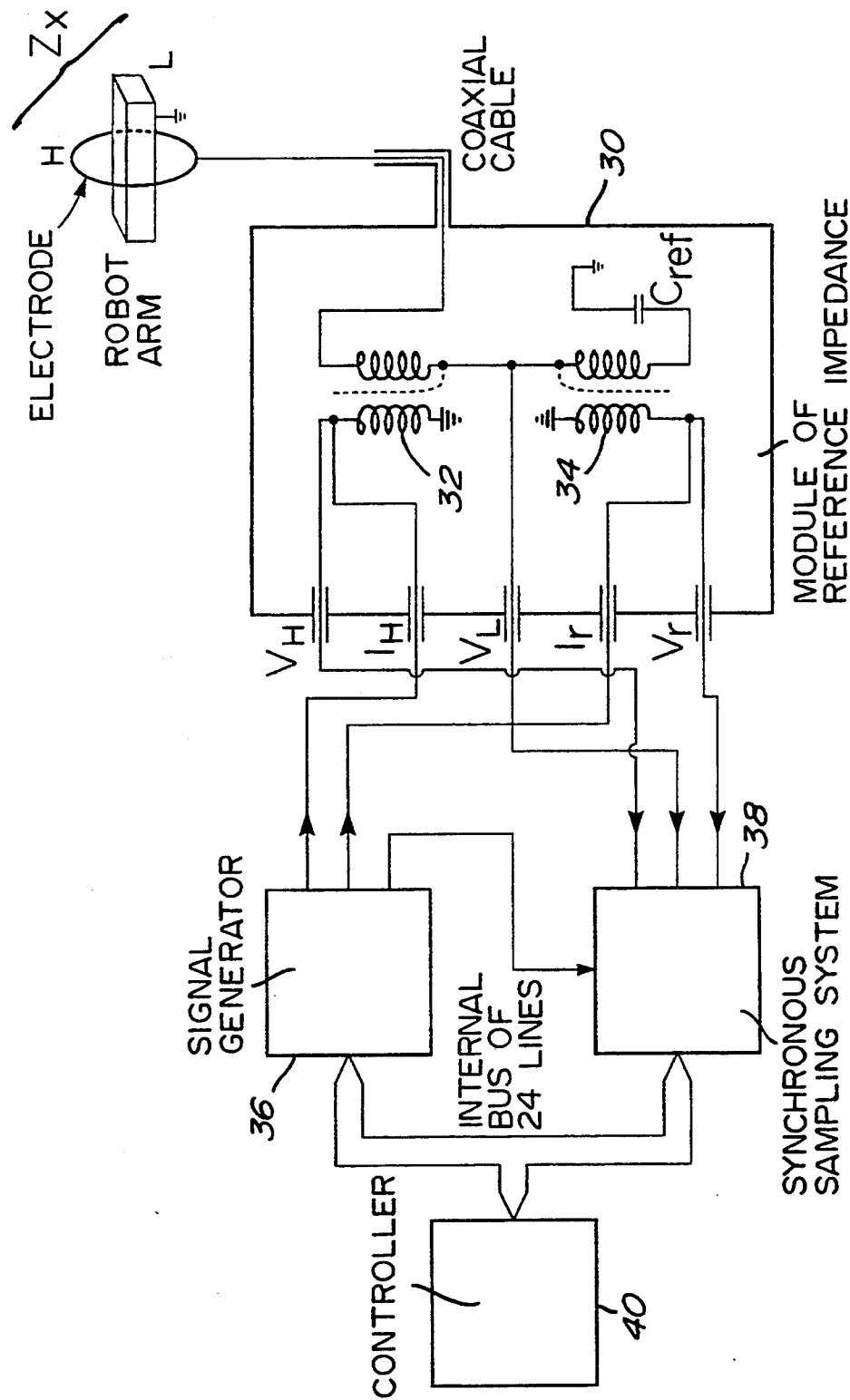
FIG. 4 shows the configuration of the system when the electrode is grounded.

FIG. 4 is a circuit diagram of one of the preferred embodiments of the present invention. As is usually the case, a robot arm L is shown grounded in this case and the electrode H forms a condenser along with L. The module of reference impedance is a grounded metallic box 30 containing a condenser $C_{ref}$ of good quality (such as polystyrene) whose nominal capacitance is equal to that of the system of electrodes. This module contains two transformers 32 and 34 connected as shown in FIG. 4. This figure also shows the manner in which the module of the reference impedance is connected to a signal generator 36 and to a synchronous sampling system 38 by five coaxial cables. The controller 40 measures the complex impedance repetitively with a rate up to 60 measurements per second. The dissipation factor D is calculated according to equation (3), and the robot is stopped (and an alarm may be sounded) if the value of D exceeds a certain threshold value. The reaction time of the system is very short and it is ideally suited for protecting technicians working near fast-moving robots and similar machines. Depending on the operating conditions, an appropriate value for the frequency of operation may be chosen between 1 KHz and 2 MHz, and the exciting voltage applied to the electrodes may have a value between 100 mV and 10 V.

Figure 5:
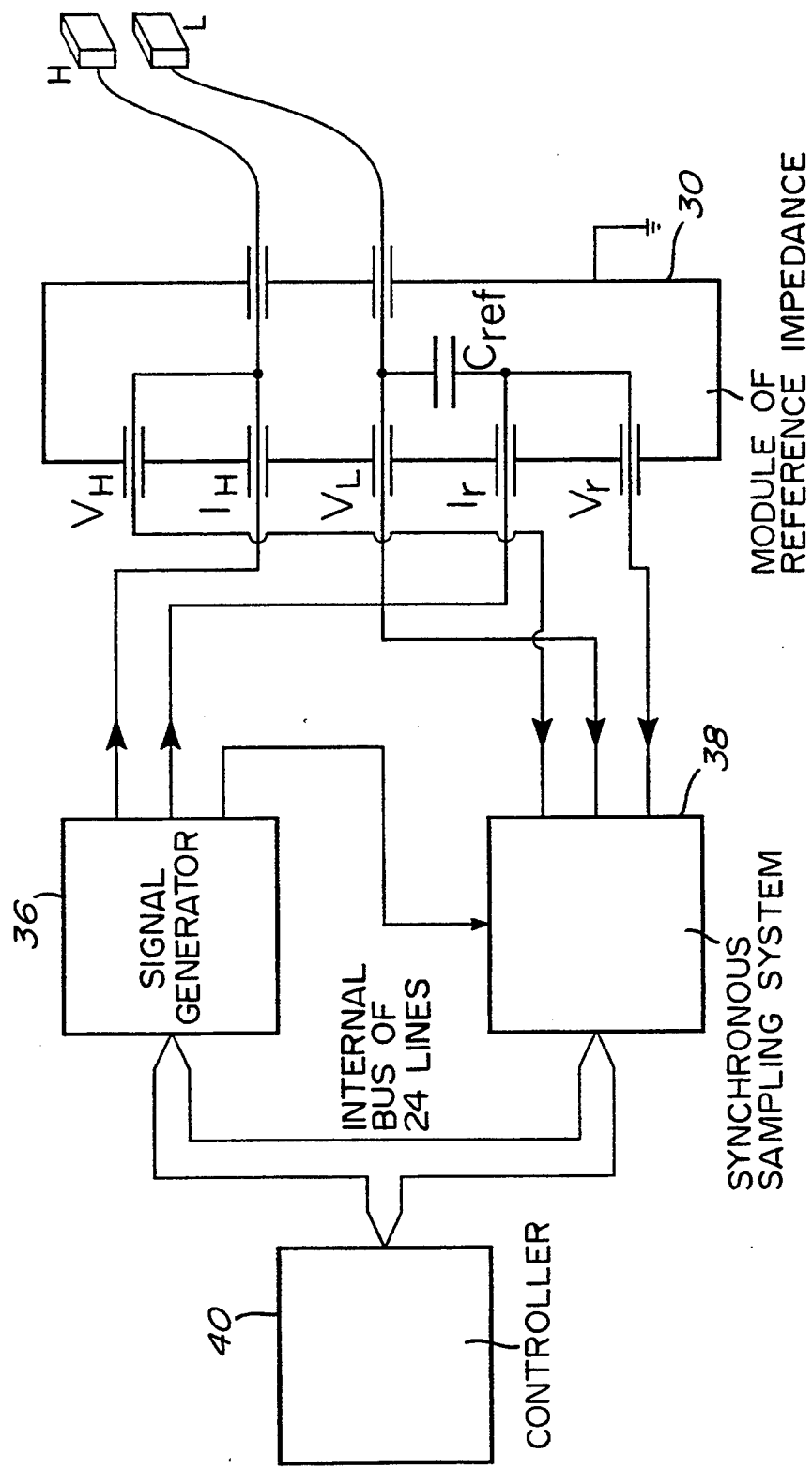
FIG. 5 shows the configuration of the system with two electrodes.
Figure 6:
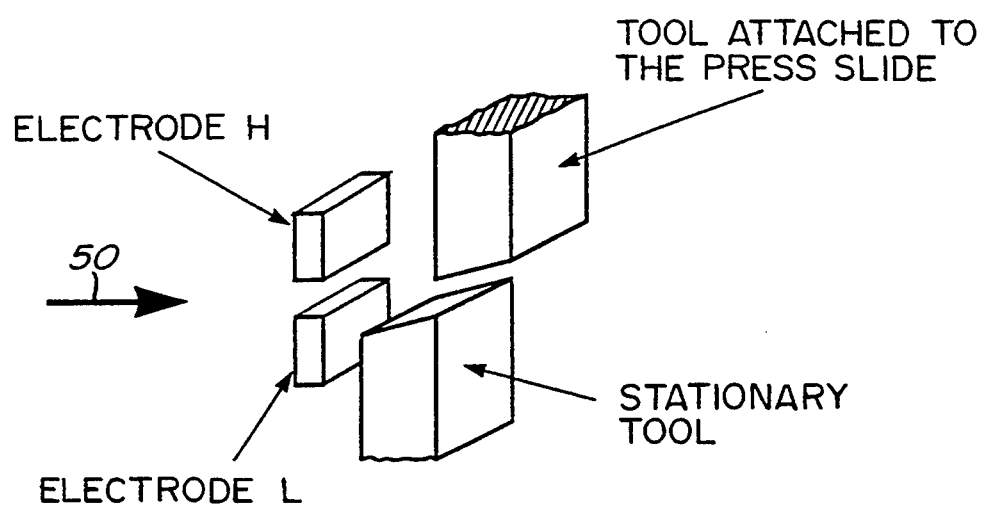
FIG. 6 illustrates the manner in which electrodes are placed in front of a punch press.

FIG. 5 is a circuit diagram of another preferred embodiment of the present invention, where both terminals H and L are used. One example of the use of such a configuration is the means to protect workers who feed workpieces manually into a punch press. As shown in FIG. 6, an electric field is created between the two electrodes H and L. As long as workpieces are introduced (as indicated by arrow 50) into the press through the space between the two electrodes, the press will work normally. But if accidentally the fingers of a worker are introduced into this space, the system will immediately detect this intrusion and will stop the movement of the slide of the press. As shown in FIG. 5, the two electrodes H and L are connected by flexible coaxial cables to the module of reference impedance.

Referring to FIG. 4 and FIG. 5, the controller, the signal generator and the synchronous sampling system are interconnected by an internal bus of 24 lines, which provides 16 lines for bidirectional data transmission and 8 lines for control. The generator provides three outputs. The signal $I_H$, which is applied to the electrode H, is a fixed-amplitude sinusoidal wave and its frequency is equal to the operating frequency $f_{op}$. It also provides another sinusoidal signal $I_r$ which is supplied to the reference impedance. Its frequency is $f_{op}$, but its amplitude and phase are programable by the controller 40. The characteristics of this signal are expressed by the equation:

$$I_r = \left(\frac{x - 2048}{1024} * I_H\right) + \left(\frac{y - 2048}{1024} * I_H * e^{-\frac{j\pi}{2}}\right) \qquad (4)$$

where x and y are integers whose values, between the limits of 0 and 4095, are programmed by the controller 40. The variable x enables the control of the amplitude (with a resolution of 12 bits) of that part of $I_r$ which is in phase with $I_H$ in the range of $-2|I_H|$ to $+2|I_H|$, whereas y enables the control of the orthogonal component in the same range. The third output of the generator is a square wave of frequency $8 \times f_{op}$ and it is supplied to the synchronous sampling system for logical operations.

The synchronous sampling system accepts the three signals $V_H$, $V_r$ and an amplified version of $V_L$. Each of these signals is integrated for a duration of $T_{op}/4$, where $T_{op}$ is the period of $I_H$. The result of this integration is numerized with a resolution of 16 bits and then is transmitted to the controller. The phase of the duration of integration with respect to the signal $I_H$ can be 0, $\pi/2$, $\pi$ or $3\pi/2$, depending on a parameter programmed by the controller.

The controller 40 incorporates a 16 bit microprocessor and it carries on the following steps repeatedly.

(1) Instructs the synchronous sampling system to take a sample with phase 0, (2) Reads the values of the samples in each channel, (3) Repeats the preceding steps with phase angles of $\pi/2$, $\pi$ and $3\pi/2$, (4) Determines the complex amplitudes of $V_H$, $V_r$ and $V_L$ from these readings, (5) Calculates the values of x and y to reduce $V_L$ to zero, and it communicates these values to the Signal generator.

(6) If $V_L$ is sufficiently small, calculates $Z_x$ using equation (2) and D using equation (3). It takes appropriate actions (sounds an alarm, stops the movement of the robot arm, the punch press slide or other machine components), if the value of the dissipation factor D exceeds a certain threshold.

Although the invention has been described above with respect with specific forms, it will be evident to a person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. A system for detecting the human presence in a given area, comprising:

an arrangement of at least one electrode located in said area defining a condenser having a capacitance $C_x$, an impedance $Z_x$ and a dissipation factor D, whose values depend on the nature of the objects located in said area;

means in electrical connection with said arrangement of at least one electrode for applying a radio frequency signal to said arrangement of at least one electrode an alternating electric field around said at least one electrode whereby human presence in said field causes a change of the characteristics of the dielectric of said condenser;

impedance bridge means, in electrical connection with said arrangement of at least one electrode, including a known reference impedance $Z_r$, a fixed voltage source $S_f$ and a source of adjustable voltage $S_a$; said sources $S_f$ and $S_a$ producing a sinusoidal voltage at an operating frequency $f_{op}$; said known reference impedance $Z_r$ said fixed voltage source $S_f$ and said adjustable voltage source $S_a$ being in electrical connection with each other and with said arrangement of at least one electrode;

vectorial detector means for measuring real and imaginary parts of the complex amplitude of a signal $V_L$ between each arms of said bridge:

circuit balancing means or continuously adjusting the voltage produced by $S_a$ to reduce said real and imaginary parts of $V_L$ to zero;

means measuring said dissipation factor D from outputs of said vectorial detector means, including means for determining a human presence in said area when a change of said dissipation factor exceeds a predetermined threshold value.

2. A system as defined in claim 1, wherein the adjustment of the voltage produced by $S_a$ consists of a feedback loop of said balancing circuit means to define the following relationship:

$$\frac{V_H}{V_r} = \frac{Z_x}{Z_r}.$$

3. A system as defined in claim 2, wherein said vectorial detector means comprise vectorial detectors $VD_2$ and $VD_3$ to measure $V_H$ and $V_r$ and wherein said dissipation factor D is calculated using the equation:

$$D = \frac{Z_x'}{Z_x''}$$

where $Z'_x$ and $Z''x$ are respectively said real and said imaginary parts of $Z_x$.

4. A system as defined in claim 3, wherein said bridge is controlled by a digital controller.

5. A system as defined in claim 1, wherein said at least one electrode is placed near a moving machine component to be guarded and are supplied with radio frequency signals by said impedance bridge through a module of reference impedance containing a reference impedance, said module being in a fixed position relative to said at least one electrode and being connected to said bridge by way of flexible coaxial cables with grounded shields.

6. A system as defined in claim 1, including a module of reference impedance mounted on a body of a machine, said body being grounded and wherein an electrode on said machine is supplied with a radio frequency signal by said impedance bridge through said module of reference impedance containing a reference impedance and two transformers, said module being in a fixed position relative to said electrode and being connected to said bridge by way of five flexible coaxial cables with grounded shields.

7. A system as defined in claim 1, wherein said known reference impedance is a capacitor whose value is equal to the capacitance $C_x$ of said at least one electrode.

* * * * *

UNITED STATES PATENT AND TRADEMARK OFFICE
CERTIFICATE OF CORRECTION

PATENT NO. : 5,436,613
DATED : July 25, 1995
INVENTOR(S) : Kalyan Ghosh, et al

It is certified that error appears in the above-indentified patent and that said Letters Patent is hereby corrected as shown below:

On the Title Page Item [75], the residence of the second inventor should read ---Trois-Rivières---.

Signed and Sealed this

Twelfth Day of December, 1995

Attest:

BRUCE LEHMAN

*Attesting Officer*  *Commissioner of Patents and Trademarks*